United States Patent [19]

Roggen

[11] Patent Number: 4,580,768

[45] Date of Patent: Apr. 8, 1986

[54] DEVICE FOR FEEDING METAL INTO A MOLTEN METAL BATH

[75] Inventor: Rolf Roggen, Sion, Switzerland

[73] Assignee: Swiss Aluminium Ltd., Chippis, Switzerland

[21] Appl. No.: 733,248

[22] Filed: May 13, 1985

Related U.S. Application Data

[62] Division of Ser. No. 631,188, Jul. 16, 1984.

[51] Int. Cl.$^4$ .............................................. C21C 7/00
[52] U.S. Cl. ...................................... 266/233; 75/53; 75/93 R
[58] Field of Search .................. 266/233; 75/53, 93 R

[56] References Cited

U.S. PATENT DOCUMENTS

| 2,100,264 | 11/1937 | Perrin ..................................... 75/57 |
| 4,298,377 | 11/1981 | Szekely ................................... 75/53 |
| 4,484,731 | 11/1984 | Taniguchi ............................... 75/53 |

Primary Examiner—Peter D. Rosenberg
Attorney, Agent, or Firm—Bachman & LaPointe

[57] ABSTRACT

A process for feeding metal to molten metal, in particular for the purpose of melting solid metal such as scrap metal or dross granules, is such that at least part of the melt is divided and each divided part set into motion rotating in opposite directions so that at least two rotating streams or "rolls" of molten metal are produced. The central axes of these rotating streams of molten metal form an angle. The metal to be melted is charged at the place where the two "rolls" of molten metal meet. The "rolls" of molten metal are produced by introducing the molten metal into a pair of pipe lengths approximately perpendicular to their central axes and approximately tangential to the cross section of the said pipe lengths, the central axes forming an angle, or by causing the molten metal in the pipe lengths to rotate by means of electrodynamic forces.

3 Claims, 2 Drawing Figures ized by the imcoming metal from the supply pipe,

DEVICE FOR FEEDING METAL INTO A MOLTEN METAL BATH

This is a division of application Ser. No. 631,188 filed July 16, 1984.

BACKGROUND OF THE INVENTION

The invention relates to a process for feeding metal to a molten metal bath, in particular for the purpose of melting down solid metal such as for example scrap metal or granular dross, and relates also to a device for accomplishing same.

With a view to protecting the environment, and in recognition of the limited availability of raw materials, increasing efforts are being made to recycle raw materials. This includes metal which appears in large amounts in industrial and household waste and applies in particular to the recycling of used cans as metal cans are being employed increasingly today as containers for drinks of various kinds.

One possibility for recycling is to introduce the scrap metal into a molten metal bath in order to melt it down. In that case it is particularly important for the solid metal to be immersed as quickly as possible in a turbulent metal stream in order to minimize oxidation of the metal and to increase the efficiency of melting. Counterproductive in this respect is that thin walled metal such as in scrap cans is much less dense than the melt; as a result, the scrap metal tends to remain on the melt surface for a long time. This is unfavorable in view of the above mentioned efforts to minimize metal oxidation and to increase melting efficiency.

On the other hand processes exist in which the melt is made to rotate in a container so that a whirlpool is formed near the middle of the melt, and the metal to be melted is introduced into the whirlpool. In practice it has been found that the metal still tends to stay on the surface of the melt, also in the whirlpool. Furthermore, the turbulence produced at the surface of the melt and at the place where the scrap is introduced into the container creates an excessive amount of dross. Also, the heat transfer from the melt to the metal is small and the resultant efficiency of melting is unsatisfactory.

The object of the present invention is therefore to develop a process and device of the above mentioned kind by means of which metal which is to be melted sinks as fast as possible below the surface of the melt and is therefore excluded from contact with air as quickly as possible. The process and the device are, furthermore, intended to be useable in many different ways and in particular should enable better mixing-in of alloying additions made to the melt. Also, it should be possible to melt down granular dross to achieve a high metal yield without the use of salts.

SUMMARY OF THE INVENTION

The foregoing object is achieved by way of the present invention wherein at least part of the melt is divided, and each part is made to rotate in a direction counter to that of the other part, so that at least two rotating streams or "rolls" of molten metal are produced, the middle axes of which are at an angle to each other, and the metal to be melted is added at that place where the two rotating "rolls" or streams of molten metal meet.

If the scrap, dross granules or alloying additions are fed to the melt from above, then the stream of metal left of the direction of metal flow is preferably set in motion rotating clockwise, the stream on the right hand side of the direction of flow in an counterclockwise rotation (negative kinetic moment opposed to positive kinetic moment). As a result, at the place where the two whirling streams of metal meet, a channel or furrow is formed into which the scrap, dross or alloying additions that are to be melted are sucked. Also the melt is repeatedly and thoroughly mixed due to this movement; there is no stationary melt surface and so no metal is held there floating on the surface.

As soon as the two whirling melt streams meet, additional turbulence is created which also ensures intimate contact between the melt and the metal to be melted down. At the same time thorough mixing of the solid and liquid phases making up the various parts of the melt is promoted. It must also be mentioned that the oxide skins are destroyed in the process. Both the heat transfer coefficient and the melting rate are considerably increased. Briefly after the whirling streams strike each other the component of rotation is lost and the melt flows almost without any agitation into the subsequent channel or a subsequent dross treatment station.

In order to split the melt into two counter-rotating streams or "rolls" two versions of the process according to the invention can be employed. In both cases the said rotating or whirling streams are produced via two pipe lengths which are joined together in such a manner that their central axes form an angle. The feeding of the metal to be melted then takes place at the place where they are joined as it is also there that the two whirling streams meet.

One case is such that the melt is made to flow approximately perpendicular to the central axes and approximately tangential into the cross section of the pair of pipe sections. The other method makes use of electrodynamic forces, in particular electromagnetic forces, to set the melt into such a motion that it rotates about the central axes. Both methods can also be used in combination.

A device of the kind described above ensures that a supply channel or pipe for the melt is provided, connecting up to a feeder station made up of at least two lidded pipe sections, the central axes of which form an angle such that the feeder station has a Y shape. The melt streams in the two pipe lengths can be made to rotate about the middle axis of the pipe length through which it passes. An opening for feeding the metal to the unit is provided at the place where the two pipe lengths meet.

One method for transferring the melt from the supply channel into the pipe sections is to divide the supply channel into two branches which feed the melt approximately perpendicular to the central axes and approximately tangentially to the cross section of the pipe length. As the metal flows into the pipe length in this manner, it is diverted from its original direction of flow, follows the inner wall of the pipe and is thus made to adopt a rotating, whirling movement.

Another version of transferring the melt is such that the supply channel connects up to the junction point of the two lengths of pipe which are enclosed by two sleeves. As a result of backpressure on the melt, the pipe lengths also become filled with melt. The sleeves then generate electromagnetic forces which act on the melt and cause it to rotate. As a result one obtains two standing, rotating streams or "rolls" of molten metal; the scrap added is wet even better due to the direct impingement by the imcoming metal from the supply pipe, and is pushed forwards by the two whirling streams of metal.

One of the most important advantages of this device is that the melting takes place in the absence of air. Consequently, the metal loss is reduced because of the diminished degree of oxidation and dross formation. The high relative speed of movement between the solid and liquid phases ensures that maximum heat transfer is achieved with this device, that is, the rate of melting is substantially increased. The very small dimension of feeder station ensure that the heat losses are small. Also, because of the simplicity of the device the investment costs and maintenance costs are insignificant. The device permits conventional scrap metal or other waste to be melted down, and allows alloying elements or other melt treatment substances to be added in any desired form. This applies is particular to the addition of dross granules from treated dross; these can be melted down without loss of metal and without any accompanying addition of fluxing agents such as salt.

BRIEF DESCRIPTION OF THE DRAWINGS

Further advantages, features and details of the invention are revealed in the following description of preferred exemplified embodiments and with the help of the drawings wherein.

DETAILED DESCRIPTION

A unit for melting metal, for example can scrap, is such that molten metal 1 is taken from a furnace, not shown here, and conducted via supply channel 2 to a feeder station R for the metal which is to be melted. From there the molten metal 1 flows back into the furnace, or for example a dross treatment station, via channel 3.

Figure 1:
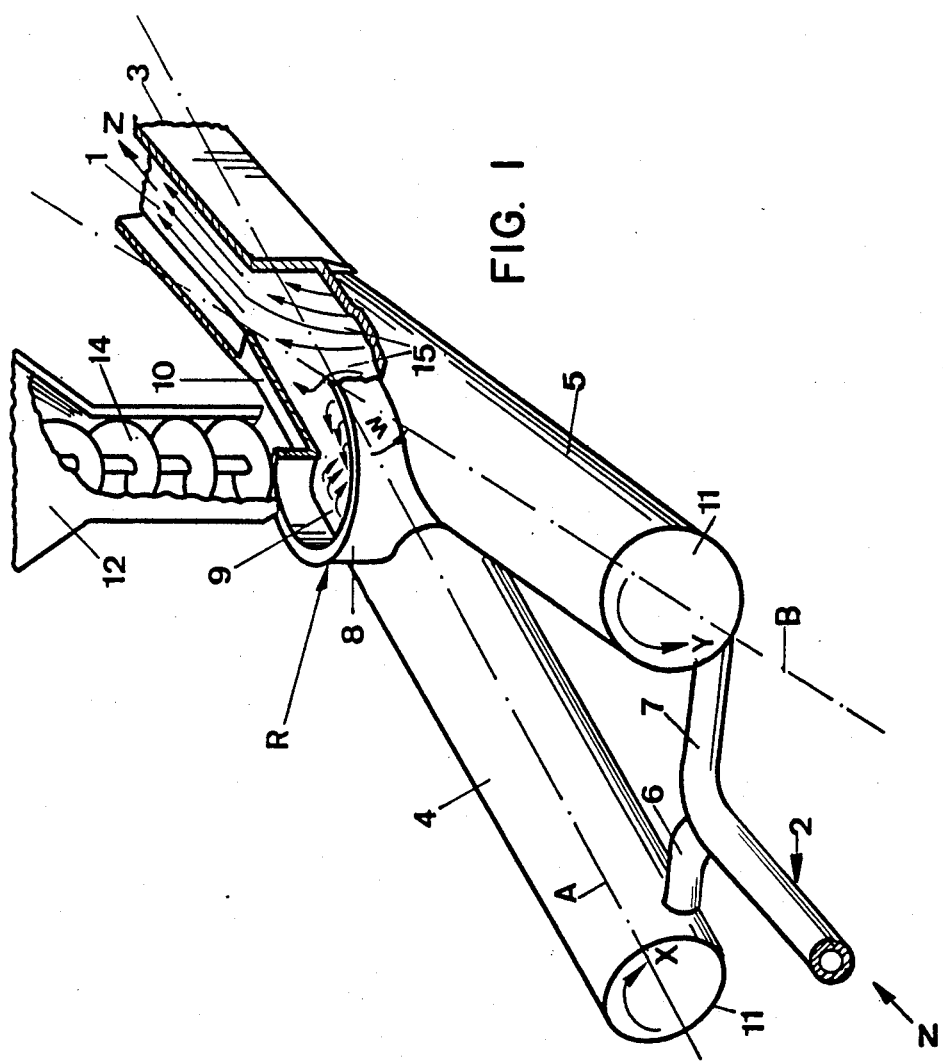
FIG. 1 is a perspective view of a partly sectioned unit for melting metal.

The feeder station R according to FIG. 1 comprises essentially two pipe lengths 4 and 5 arranged in a Y shape; connecting up to pipes 4 and 5, approximately perpendicular to their central axes A and B, are branches 6 and 7 respectively of supply pipe 2. The pipe lengths 4 and 5 meet at an opening 9 which serves as a charging point 8 for the metal which is to be melted down; from that point the pipes 4 and 5 continue as one in the form of a pipe 10 which joins up with channel 3. The central axes A and B form an angle w with each other. At the end away from the charging point 8 the pipe lengths 4 and 5 are closed off by lids 11.

Situated above the charging point 8 or opening 9 is a silo 12 from which metal that is to be melted, not shown here, is introduced by means of a screw conveyor 14 to the melt 1 through the opening 9.

The melt 1 enters pipes 4 and 5 via supply pipe 2. As it enters approximately perpendicular and tangential to these pipe lengths 4 and 5 via branches 6 and 7 respectively of pipe 2, the melt is forced into a circular motion inside the pipes 4 and 5 around the central axes A and B. The direction of flow of the melt 1 into pipes 4 and 5 is such that the melt rotates in the clockwise direction x in pipe 4 and in the counterclockwise direction y in pipe 5. Both streams or "rolls" of melt meet in the region of the opening 9 below the silo 12. Arrows 15 indicate the continued path of the melt 1. If metal from the silo 12 is now added, it inters the furrow formed by the melt streams for simplicity indicated here by arrows 15, is "sucked" in by the melt and completely wet by it. As they meet the "rolls" of molten metal destroy each other which promotes further thorough mixing of the metal additions and the molten melt 1. In pipe 10 the rotational movement of the melt is eliminated and the melt flows on quietly into a dross treatment station or the like, not shown here.

Figure 2:
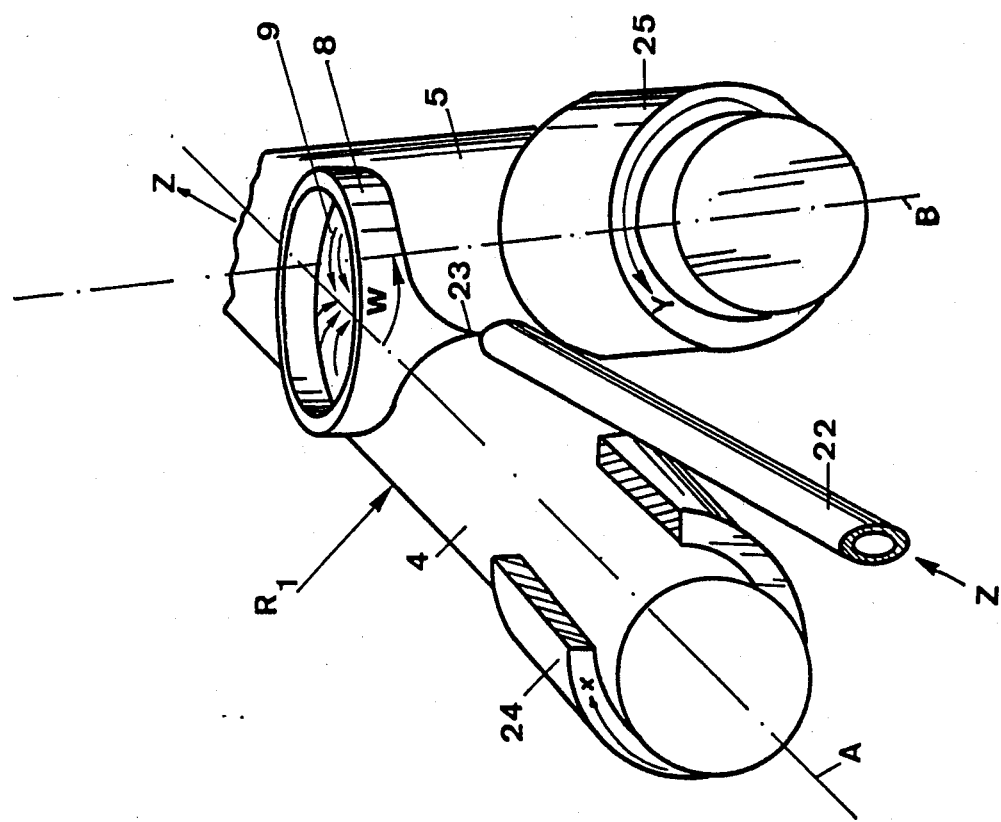
FIG. 2 is a perspective view of a further exemplified embodiment as in FIG. 1.

In the version according to FIG. 2 the feeder station $R_1$ likewise comprises two closed pipe lengths 4 and 5, the central axes A and B of which run at an angle w to each other and meet at a point where there is an opening 9 next to a charging inlet 8 for the metal which is to be melted down. Here the melt is introduced to the feeder station $R_1$ via pipe 22 which runs in the direction of flow of the melt z and meets the feeder station $R_1$ directly at the join 23 of both pipe lengths 4 and 5 below the charging inlet 8.

Provided on pipe lengths 4 and 5 are sleeves 24 and 25 respectively which act as stators and induce a rotary field in the melt such that the melt in pipe 4 rotates in the clockwise direction x while the melt in pipe 5 rotates in the opposite direction. The rotation of the melt can also be achieved for example by providing pipes 4 and 5 with the rotors of a motor, not shown here.

As a result again two counterflowing streams or "rolls" of melt are achieved and with that the above described capacity for taking in metal which is to be melted. The sleeves 24 and 25 can, according to the invention, be employed to assist in the formation of the "rolls" of melt in accordance with the version of the feeder station R in FIG. 1.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A device for melting metal in a stream of molten metal comprising a first elongated pipe having a first central axis, a second elongated pipe having a second central axis intersecting said first central axis, inlet means associated with said first pipe and said second pipe for introducing molten metal into said pipes, such that said molten metal flows to the area where said first axis intersects said second axis, feeder means for feeding the metal to be melted to said area and means associated with said first pipe and said second pipe for producing a first stream of molten metal rotating in a clockwise direction in said first pipe and a second stream of molten metal rotating in a counterclockwise direction in said second pipe so as to form a furrow in the area where said first axis intersects said second axis.

2. A device according to claim 1 wherein said inlet means comprises two branches which introduce said molten metal to said pipes approximately perpendicular to their axis and approximately tangential to the cross section of the said pipes.

3. A device according to claim 1 wherein means for creating electromagnetic forces are provided around the pipes to create the clockwise and counterclockwise rotation.

* * * * *